US012011722B2

(12) United States Patent
Hunting

(10) Patent No.: US 12,011,722 B2
(45) Date of Patent: Jun. 18, 2024

(54) CRUSHING OF CORE SAMPLES

(71) Applicant: ORBIS MINING PTY LTD., Lake Clifton (AU)

(72) Inventor: Bradley James Hunting, Lake Clifton (AU)

(73) Assignee: ORBIS MINING PTY LTD., Lake Clifton (AU)

( * ) Notice: Subject to any disclaimer, the term of this patent is extended or adjusted under 35 U.S.C. 154(b) by 456 days.

(21) Appl. No.: 17/312,691

(22) PCT Filed: Dec. 10, 2019

(86) PCT No.: PCT/AU2019/051354
§ 371 (c)(1),
(2) Date: Jun. 10, 2021

(87) PCT Pub. No.: WO2020/118360
PCT Pub. Date: Jun. 18, 2020

(65) Prior Publication Data

US 2022/0062913 A1 Mar. 3, 2022

(30) Foreign Application Priority Data

Dec. 11, 2018 (AU) ................................ 2018904710

(51) Int. Cl.
*B02C 1/10* (2006.01)

(52) U.S. Cl.
CPC ............ *B02C 1/10* (2013.01); *B02C 2210/02* (2013.01)

(58) Field of Classification Search
CPC ...... B02C 1/10; B02C 2210/02; B02C 17/225
USPC .......................................................... 241/300
See application file for complete search history.

(56) References Cited

U.S. PATENT DOCUMENTS

| | | | | | |
|---|---|---|---|---|---|
| 2,058,257 | A | * | 10/1936 | Porteous | B02C 17/225 451/328 |
| 2,122,033 | A | * | 6/1938 | Hallenbeck | B02C 1/10 241/291 |
| 2,130,673 | A | * | 9/1938 | Meister | B02C 1/10 241/291 |
| 2,222,768 | A | * | 11/1940 | Gruender | B02C 1/10 241/300 |
| 2,326,215 | A | * | 8/1943 | Gruender | B02C 1/04 241/300 |
| 2,666,590 | A | * | 1/1954 | Pryor | B02C 1/14 403/267 |
| 2,828,925 | A | * | 4/1958 | Rumpel | B02C 1/10 241/300 |

(Continued)

OTHER PUBLICATIONS

International Search Report Form PCT/ISA/210, and Written Opinion Form PCT/ISA/237, International Application No. PCT/AU2019/051354 pp. 1-8 International Filing Date Dec. 10, 2019 dated Feb. 26, 2020.

*Primary Examiner* — Faye Francis
(74) *Attorney, Agent, or Firm* — BOND, SCHOENECK & KING, PLLC; George R. McGuire

(57) ABSTRACT

A crusher for cylindrical core samples has two oscillating wear plates. Each wear plate has an angled introductory portion, which open to a mouth sufficiently large to receive core samples having diameter above 100 mm. Each wear plate has at least one intermediate surface extending between each angled introductory portion and a curved central portion of the wear plate.

28 Claims, 2 Drawing Sheets

(56) References Cited

U.S. PATENT DOCUMENTS

| | | | | | |
|---|---|---|---|---|---|
| 2,950,871 | A * | 8/1960 | Smith | B02C 1/10 | 100/902 |
| 2,970,775 | A * | 2/1961 | Chapman | B29B 13/10 | 241/300 |
| 3,075,713 | A | 1/1963 | Kautz | | |
| 3,079,096 | A | 2/1963 | McConnel | | |
| 3,129,899 | A * | 4/1964 | Ratkowski | B02C 1/10 | 241/300 |
| 3,201,054 | A * | 8/1965 | King | B02C 1/10 | 241/291 |
| 3,353,758 | A * | 11/1967 | Whaley | B02C 2/005 | 228/141.1 |
| 3,380,674 | A | 4/1968 | Bruns | | |
| 3,527,420 | A * | 9/1970 | Maurer | B02C 1/10 | 241/291 |
| 3,946,955 | A | 3/1976 | Bond | | |
| 4,664,324 | A * | 5/1987 | Dopson | B02C 17/225 | 241/300 |
| 5,752,665 | A * | 5/1998 | Wason | B02C 17/225 | 241/300 |
| 5,839,677 | A * | 11/1998 | Guerard | B02C 15/003 | 241/300 |
| 8,016,220 | B2 * | 9/2011 | Melo | B02C 17/22 | 241/183 |
| 9,724,696 | B2 * | 8/2017 | Peltomaki | B02C 1/04 | |

* cited by examiner

CRUSHING OF CORE SAMPLES

CROSS-REFERENCE TO RELATED APPLICATIONS

This is a National Stage Application filed under 35 U.S.C. 371 based on International Patent Application No. PCT/AU2019/051354, filed on Dec. 10, 2019, which claims priority to Australian Patent Application No. 2018904710 filed on Dec. 11, 2018, the disclosures of both of which are incorporated herein by reference in their entireties.

FIELD OF THE INVENTION

The present invention relates to the crushing of geological core samples for analysis purposes.

BACKGROUND TO THE INVENTION

Geological core samples are frequently drilled in order to determine the presence of minerals and to provide information for a geological map of an area. Often, these core samples are obtained as cylindrical cores comprised of rock.

In order for chemical analysis to be performed on a core sample, the sample must first be crushed and ground, typically to a particle size in the order of 2 mm.

One efficient means of crushing core samples to a desired size is the use of two oscillating wear plates, each having a generally convex wear surface. The two plates are contra-rotated to provide a pulsing and grinding action on the core samples. The New Zealand company Rocklabs is believed to be the first company to manufacture these machines.

Such machines, while effective, have a notable drawback. They are limited in the size of core sample they are able to crush. Generally, a core sample must have an outer diameter less than about 70 mm in order to be efficiently crushed by an oscillating plate crusher such as the Rocklabs crusher. To be able to receive a larger core sample, the plates must be spaced further apart, which prevents them being able to grind the sample down to the required size for analysis.

A typical core sample has a diameter up to about 110 mm. This means that significant treatment must be performed on the sample before it can be crushed by an oscillating plate crusher.

A typical crusher plate 10 from within an oscillating plate crusher of the prior art is shown in cross section in FIG. 1. It has a width of about 300 mm. It has a wear side 12 which has introductory portions 14 extending inwards about 50 mm from either edge, and then a central curved wear portion 16 extending between the introductory portions 14. The introductory portions 14 are flat, and angled at about 10.8° relative to a base of the crusher plate 10. The curved wear portion 16 has a radius of curvature in the order of 870 mm.

The present invention seeks to provide a means by which larger samples can be used within an oscillating plate crusher.

SUMMARY OF THE INVENTION

Key to the present invention is an understanding that the limiting factor in the sample size which can be accepted by an oscillating plate crusher is based on the plate geometry.

According to one aspect of the present invention there is provided a wear plate for a crusher, the wear plate having a wear side, the wear side having two opposed outer edges, the wear side including two respective flat introductory portions, one flat introductory portion extending inwardly from each outer edge; a central curved wear portion; and at least one intermediate flat wear portion extending between each introductory portion and the central curved wear portion, each intermediate flat wear portion being angled with respect to its respective introductory portion, the angle between the intermediate flat wear portion and its respective introductory portion being between 2° and 30°.

It is preferred that each introductory portion is angled at between 12° and 20° relative to a base of the wear plate. In a preferred embodiment, each introductory portion is angled at 15° relative to the base of the wear plate.

It is preferred that each intermediate flat wear portion is angled at between 5° and 20° relative to its respective introductory base portion. It is most preferred that each intermediate flat wear portion is angled at between 8° and 12° relative to its respective introductory base portion.

The wear plate has a plate width defined as the distance between the two opposed outer edges. It is preferred that each introductory portion extends between 10% and 20% of the plate width. More preferably, each introductory portion extends between 12% and 15% of the plate width. In a preferred embodiment, each introductory portion extends about 14% of the plate width.

It is preferred that each intermediate flat wear portion extends between 10% and 20% of the plate width. More preferably, each intermediate flat wear portion extends between 10% and 15% of the plate width. In a preferred embodiment, each intermediate flat wear portion extends about 12% of the plate width.

The wear plate may have two intermediate flat wear portions extending between each introductory portion and the central curved wear portion. In this embodiment, the wear plate may have a primary intermediate flat wear portion angled at between 2° and 15° relative to its respective introductory base portion, and a secondary intermediate flat portion angled at between 2° and 15° relative to the primary intermediate flat portion.

It is preferred that each primary intermediate flat wear portion is angled at between 2° and 8° relative to its respective introductory base portion. It is further preferred that each primary intermediate flat wear portion is angled at between 3.5° and 5.5° relative to its respective introductory base portion. In a most preferred embodiment each primary intermediate flat wear portion is angled at about 4.5° relative to its respective introductory base portion.

It is preferred that each secondary intermediate flat portion is angled at between 3° and 9° relative to its corresponding primary intermediate flat portion. It is further preferred that each secondary intermediate flat portion is angled at between 4° and 6° relative to its corresponding primary intermediate flat portion. In a most preferred embodiment each secondary intermediate flat wear portion is angled at about 5.2° relative to its corresponding primary intermediate flat portion.

In an embodiment having two intermediate flat wear portions on each side it is preferred that each introductory portion extends between 5% and 20% of the plate width. More preferably, each introductory portion extends between 10% and 15% of the plate width. In a most preferred embodiment, each introductory portion extends about 12% of the plate width.

It is preferred that each primary intermediate flat wear portion extends between 2% and 20% of the plate width. It is further preferred that each primary intermediate flat wear portion extends between 2% and 6% of the plate width. In a most preferred embodiment, each primary intermediate flat wear portion extends about 4% of the plate width.

It is preferred that each secondary intermediate flat wear portion extends between 5% and 20% of the plate width. It is preferred that each secondary intermediate flat wear portion extends between 8% and 12% of the plate width. In a most preferred embodiment, each secondary intermediate flat wear portion extends about 10% of the plate width.

BRIEF DESCRIPTION OF THE DRAWINGS

It will be convenient to further describe the invention with reference to preferred embodiments of the present invention. Other embodiments are possible, and consequently the particularity of the following discussion is not to be understood as superseding the generality of the preceding description of the invention. In the drawings.

DETAILED DESCRIPTION OF PREFERRED EMBODIMENTS

Figure 1:
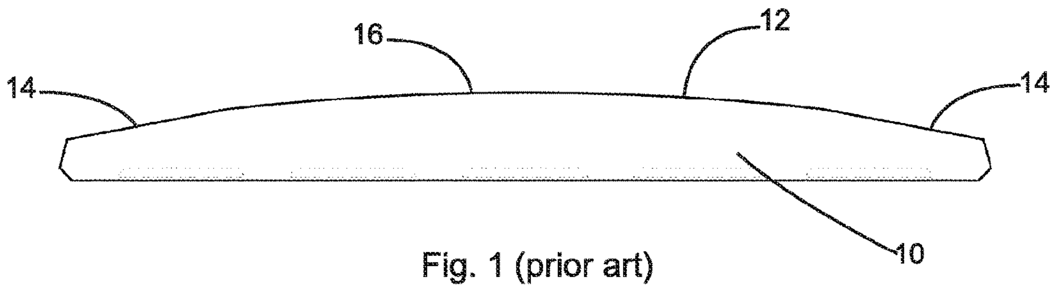
Fig. 1 (prior art)
FIG. 1 is a cross section through a crusher wear plate of the prior art.
Figure 2:
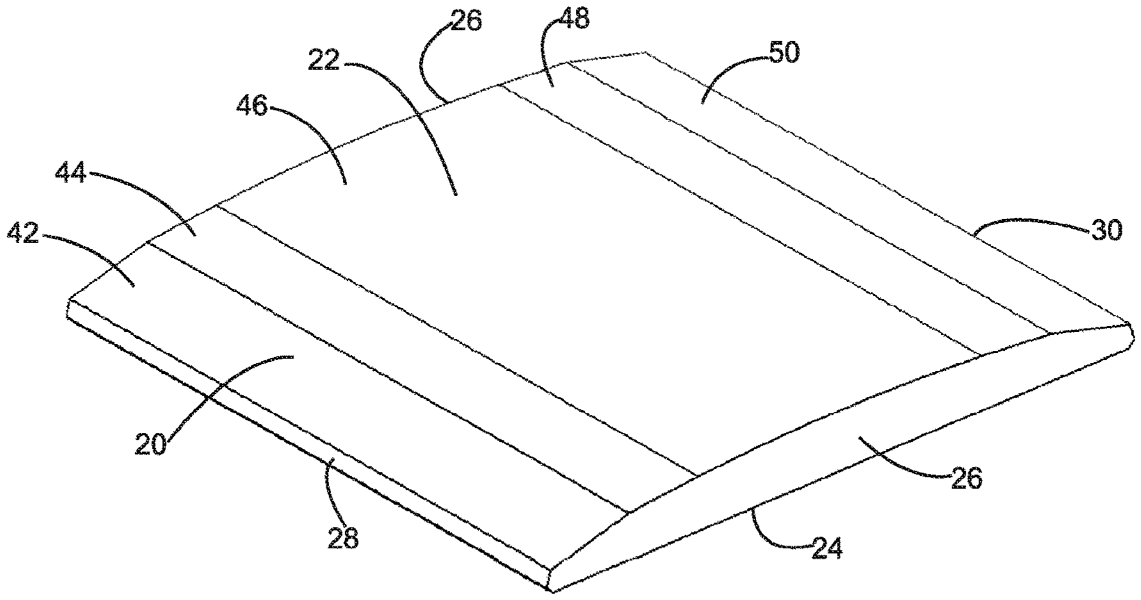
FIG. 2 is a perspective of a crusher wear plate in accordance with a first embodiment of the present invention.
Figure 3:
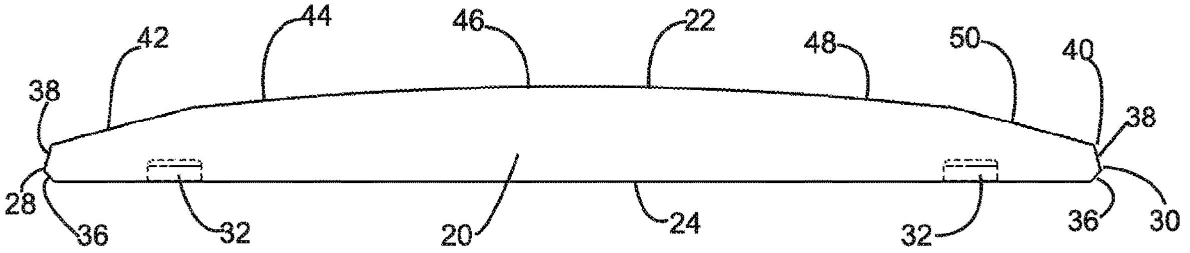
FIG. 3 is a cross section through the crusher wear plate of FIG. 2.
Figure 4:
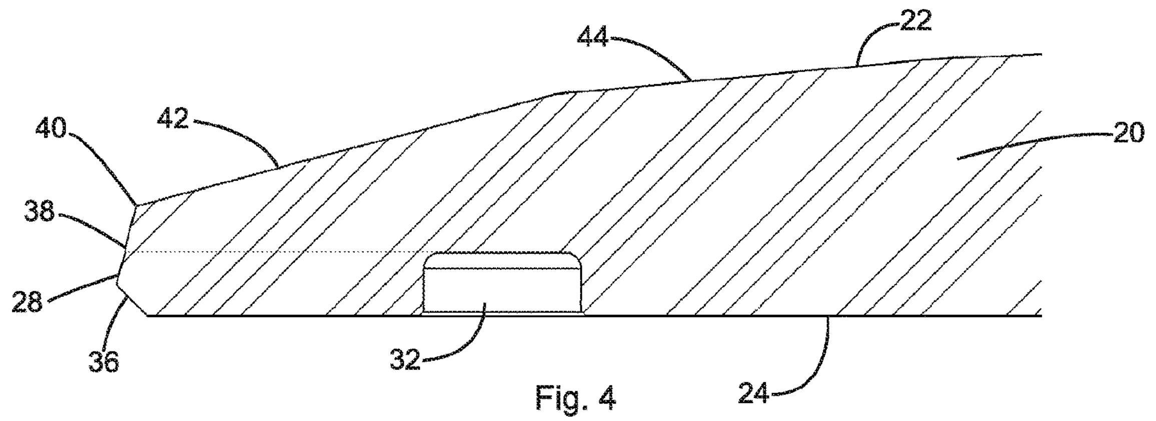
FIG. 4 is a cross section through a portion of the crusher wear plate of FIG. 2.

Referring to FIGS. 2 to 4, there is shown a crusher plate 20 having a wear side 22 and base 24. The crusher plate 20 is prismatic in shape, having a constant cross sectional shape which corresponds to the shape of two opposed end edges 26. The crusher plate 20 has a first side edge 28 and a second side edge 30, each of which extend between the opposed end edges 26.

The base 24 is generally flat and square, having an edge of about 396 mm. The base 24 includes sunken mounting apertures 32 located at appropriate locations for attachment of the crusher plate 20 within a crushing unit.

Each side edge 28, 30 includes an outwardly tapered lower portion 36 and an inwardly tapered upper portion 38. The lower portion 36 is angled at about 45° relative to the base 24. The upper portion 38 makes an angle of about 120° relative to the lower portion 36. The lower portion 36 has a length of about 6 mm, and the upper portion 38 has a length of about 12 mm. The result is that each side edge 28, 30 terminates at an upper end 40 located slightly outside the corresponding edge of the base 24.

The wear side 22 has a first introductory portion 42, a first intermediate portion 44, a central portion 46, a second intermediate portion 48 and a second introductory portion 50, spaced in this order across the wear side 22 from the first side edge 28 to the second side edge 30.

The first introductory portion 42 forms an angle of 15° with respect to the base 24; that is, an angle of about 120° relative to the upper portion 38 of the first side edge 28. The first introductory portion extends along a width of about 55 mm. The first introductory portion 42 has a flat surface.

The first intermediate portion 44 similarly has a flat surface. It forms an angle of about 5.3° relative to the base 24; that is, it is 'flattened' by an angle of about 9.7° relative to the first introductory portion 42. The first intermediate portion 44 extends along a width of about 47 mm.

The central portion 46 is convexly curved, having a radius of curvature of about 1300 mm.

The second intermediate portion 48 and the second introductory portion 50 are mirror images of the first intermediate portion 44 and first introductory portion 42 respectively.

It will be appreciated that putting two wear plates 20 against each other will create an introductory 'mouth' having an opening of about 30°. As the wear plates 20 each rotate this has the effect of altering the size of this mouth between about 50 mm and about 110 mm. It is therefore capable of receiving core samples of up to about 110 mm in diameter.

Figure 5:
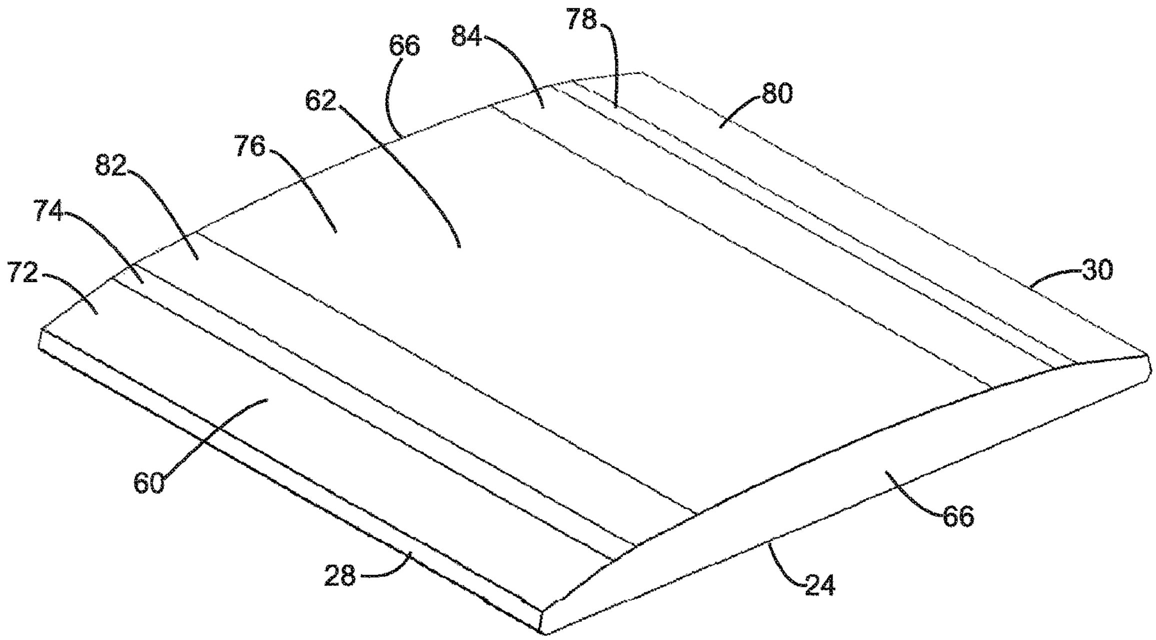
FIG. 5 is a perspective of a crusher wear plate in accordance with a second embodiment of the present invention.
Figure 6:
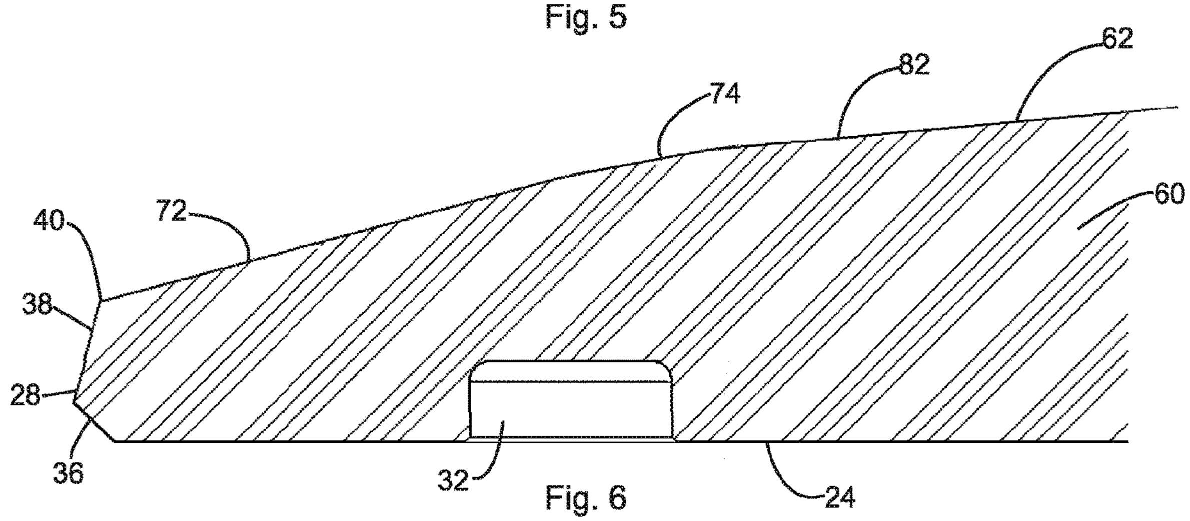
FIG. 6 is a cross section through a portion of the crusher wear plate of FIG. 5.

A second embodiment of the invention is shown in FIGS. 5 and 6, where like numbers refer to like features of the two embodiments. This embodiment is a crusher plate 60 having a wear side 62 and base 24. The crusher plate 60 is prismatic in shape, having a constant cross sectional shape which corresponds to the shape of two opposed end edges 66. The crusher plate 60 has a first side edge 28 and a second side edge 30, each of which extend between the opposed end edges 66.

The wear side 62 has a first introductory portion 72, a first primary intermediate portion 74, a first secondary intermediate portion 82, a central portion 76, a second secondary intermediate portion 84, a second primary intermediate portion 78 and a second introductory portion 80, spaced in this order across the wear side 62 from the first side edge 28 to the second side edge 30.

The first introductory portion 72 forms an angle of 15° with respect to the base 24; that is, an angle of about 120° relative to the upper portion 38 of the first side edge 28. The first introductory portion 72 extends along a width of about 47 mm. The first introductory portion 72 has a flat surface.

The first primary intermediate portion 74 similarly has a flat surface. It forms an angle of about 10.5° relative to the base 24; that is, it is 'flattened' by an angle of about 4.5° relative to the first introductory portion 72. The first primary intermediate portion 74 extends along a width of about 15 mm.

The first secondary intermediate portion 82 also has a flat surface. It forms an angle of about 5.3° relative to the base 24; that is, it is 'flattened' by an angle of about 5.2° relative to the first primary intermediate portion 74. The first secondary intermediate portion 82 extends along a width of about 40 mm.

The central portion 76 is convexly curved, having a radius of curvature of about 1300 mm.

The second secondary intermediate portion 84, the second primary intermediate portion 78 and the second introductory portion 80 are mirror images of the first secondary intermediate portion 82, the first primary intermediate portion 74 and first introductory portion 72 respectively.

Modifications and variations as would be apparent to a skilled addressee are deemed to be within the scope of the present invention.

What is claimed is:

1. A wear plate for a crusher, the wear plate having a wear side, the wear side having two opposed outer edges, the wear side including two respective flat introductory portions whereby one flat introductory portion extends inwardly from each outer edge; a central curved wear portion; and at least one intermediate flat wear portion extending between each introductory portion and the central curved wear portion, each introductory portion being associated with an intermediate flat wear portion, the introductory portion being angled with respect to its associated intermediate flat wear portion, the angle between the introductory portion and its associated intermediate flat wear portion being between 2° and 30°.

2. A wear plate as claimed in claim 1, wherein each introductory portion is angled at between 12° and 20° relative to a base of the wear plate.

3. A wear plate as claimed in claim 2, wherein each introductory portion is angled at about 15° relative to the base of the wear plate.

4. A wear plate as claimed in claim 1, wherein the angle between the introductory portion and its associated intermediate flat wear portion is between 2° and 20°.

5. A wear plate as claimed in claim 4, wherein the angle between the introductory portion and its associated intermediate flat wear portion is between 8° and 12°.

6. A wear plate as claimed in claim 1, wherein each introductory portion extends between 10% and 20% of a plate width.

7. A wear plate as claimed in claim 6, wherein each introductory portion extends between 12% and 15% of the plate width.

8. A wear plate as claimed in claim 7, wherein each introductory portion extends about 14% of the plate width.

9. A wear plate as claimed in claim 1, wherein each intermediate flat wear portion extends between 10% and 20% of the plate width.

10. A wear plate as claimed in claim 9, wherein each intermediate flat wear portion extends between 10% and 15% of the plate width.

11. A wear plate as claimed in claim 10, wherein each intermediate flat wear portion extends about 12% of the plate width.

12. A wear plate as claimed in claim 1, wherein the wear plate has two intermediate flat wear portions extending between each introductory portion and the central curved wear portion.

13. A wear plate as claimed in claim 12, wherein the wear plate has an primary intermediate flat wear portion associated with an introductory portion, the primary intermediate flat wear portion angled at between 2° and 15° relative to its associated introductory portion, and a secondary intermediate flat portion angled at between 2° and 15° relative to the primary intermediate flat portion.

14. A wear plate as claimed in claim 13, wherein each primary intermediate flat wear portion is angled at between 2° and 8° relative to its associated introductory portion.

15. A wear plate as claimed in claim 14, wherein each primary intermediate flat wear portion is angled at between 3.5° and 5.5° relative to its associated introductory portion.

16. A wear plate as claimed in claim 15, wherein each primary intermediate flat wear portion is angled at about 4.5° relative to its associated introductory portion.

17. A wear plate as claimed in claim 13, wherein each secondary intermediate flat portion is angled at between 3° and 9° relative to its corresponding primary intermediate flat portion.

18. A wear plate as claimed in claim 17, wherein each secondary intermediate flat portion is angled at between 4° and 6° relative to its corresponding primary intermediate flat portion.

19. A wear plate as claimed in claim 18, wherein each secondary intermediate flat wear portion is angled at about 5.2° relative to its corresponding primary intermediate flat portion.

20. A wear plate as claimed in claim 12, wherein each introductory portion extends between 5% and 20% of the plate width.

21. A wear plate as claimed in claim 20, wherein each introductory portion extends between 10% and 15% of the plate width.

22. A wear plate as claimed in claim 21, wherein each introductory portion extends about 12% of the plate width.

23. A wear plate as claimed in claim 13, wherein each primary intermediate flat wear portion extends between 2% and 20% of the plate width.

24. A wear plate as claimed in claim 23, wherein each primary intermediate flat wear portion extends between 2% and 6% of the plate width.

25. A wear plate as claimed in claim 24, wherein each primary intermediate flat wear portion extends about 4% of the plate width.

26. A wear plate as claimed in claim 13, wherein each secondary intermediate flat wear portion extends between 5% and 20% of the plate width.

27. A wear plate as claimed in claim 26, wherein each secondary intermediate flat wear portion extends between 8% and 12% of the plate width.

28. A wear plate as claimed in claim 27, wherein each secondary intermediate flat wear portion extends about 10% of the plate width.

* * * * *